Aug. 26, 1969 H. P. HEARN 3,463,228
TORQUE RESISTANT COUPLING FOR WELL TOOL
Filed Dec. 29, 1967 2 Sheets-Sheet 1

INVENTOR
HOSEA P. HEARN

BY *Burns, Doane, Benedict, Swecker & Mathis*

ATTORNEYS

Aug. 26, 1969    H. P. HEARN    3,463,228
TORQUE RESISTANT COUPLING FOR WELL TOOL
Filed Dec. 29, 1967    2 Sheets-Sheet 2

INVENTOR
HOSEA P. HEARN

BY *Burns, Doane, Benedict, Swecker & Mathis*

ATTORNEYS.

United States Patent Office 3,463,228
Patented Aug. 26, 1969

3,463,228
TORQUE RESISTANT COUPLING FOR
WELL TOOL
Hosea P. Hearn, Duncan, Okla., assignor to Halliburton
Company, Duncan, Okla., a corporation of Delaware
Filed Dec. 29, 1967, Ser. No. 694,458
Int. Cl. E21b *33/12;* F16l *25/00*
U.S. Cl. 166—181                8 Claims

ABSTRACT OF THE DISCLOSURE

This invention pertains to a torque-resistant coupling incorporated in a well tool. In particular, it relates to such a coupling adapted to connect a packer shoe to a packer coupling portion to maintain the packer shoe integral with the packer while the packer shoe and packer are being partially drilled away. A well tool apparatus including first and second threaded coupling units interconnected by an integrally threaded sleeve. The threaded coupling units are provided with mutually facing, saw teeth structures. The saw teeth structures, which are symmetrical with respect to radial planes of the units, are interengaged so as to provide an effective, torque transmitting relation between the units.

BACKGROUND AND GENERAL OBJECTS OF INVENTION

Well tools often include superposed components which are threadedly interconnected.

Occasionally, such well tools become stuck or lodged within a well bore and it becomes necessary to drill away exterior portions of the tools so as to free the tools from the well bores and allow for their withdrawal from the well bores. If a one component, of a series of threadedly interconnected well tool components, being acted upon by a milling tool should become free with respect to the remainder of the tool, it would tend to turn with the milling tool rather than remain in place and be drilled away. The freed component would then tend to function as a bearing, engaging the lower end of the milling tool and thereby prevent the milling tool from performing its cutting operation.

It thus becomes important to effectively unitize threadedly interconnected tool components which are potentially subject to such milling operations so as to insure that a component does not free itself during a milling operation and thus impair the milling away of stuck tool portions.

In the past, such rigidification has been attempted by providing longitudinally extending lugs which coact with longitudinally extending grooves. With this arrangement, the lugs carried by one component project into the grooves carried by the other component so as to provide a tongue and groove coupling, with torque transmitting faces extending longitudinally thereof.

In some unusual instances, it has been found that this form of rigidification is vulnerable to torque-induced failure in torque loads imposed by milling tools.

Because of this possibility of torque-induced failures under unusually adverse conditions, it is an object of the present invention to provide an improved coupling between well tool components. This coupling is designed to increase, many fold, the torque load required to induce circumferential sheer failure between tool components.

It is likewise an object of the invention to provide such an improved interconnection between tool components which is characterized by overall structural simplicity and ease of manufacture.

It is a still further object of the invention to provide such an improved connection which yields significantly improved sheer resistant strength without being dependent upon undue precision in manufacture.

SUMMARY OF INVENTION

A well tool comprising first and second, generally tubular male, threaded coupling means. A third, generally tubular, female threaded coupling means threadably interconnects the first and second coupling means in substantially contiguous and mutually facing engagement. The first, second, and third interconnected coupling means have a common, longitudinally extending, central axis.

A first series of circumferentially spaced, torque-transmitting, first surface means is carried by the first coupling means. Each of the first surface means of this series extends transversely of a plane which extends radially of the common longitudinal axis. A second series of circumferentially spaced, torque-transmitting, second surface means is also carried by the first coupling means. Each such second surface means extends transversely of a plane which, itself, extends radially of the common axis. Each second surface means extends transversely of a circumferentially adjacent first surface means.

A third and fourth series of circumferentially spaced, third surface means and fourth surface means, respectively, are carried by the second coupling means. The third and fourth surface means are related to the second coupling means in the same fashion that the first and second surface means are related to the first coupling means

DRAWINGS

In describing the invention, reference will be made to a preferred embodiment shown in the appended drawings.

Figure 1:
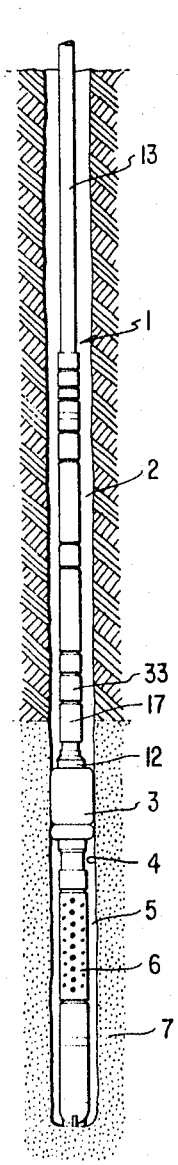
FIGURE 1 illustrates a well tool comprising a packer expanded radially into engagement with a well bore wall.
Figure 3:
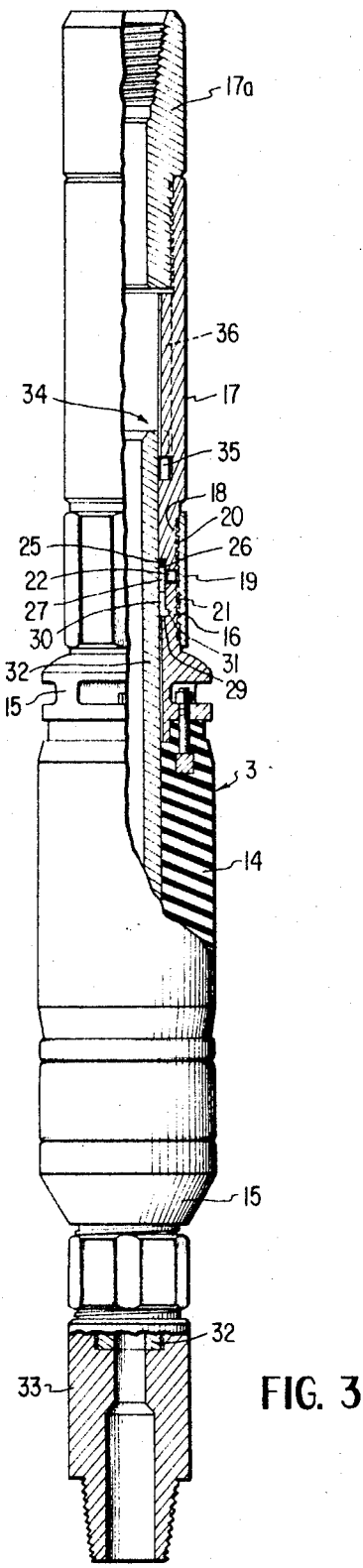
Figure 4:
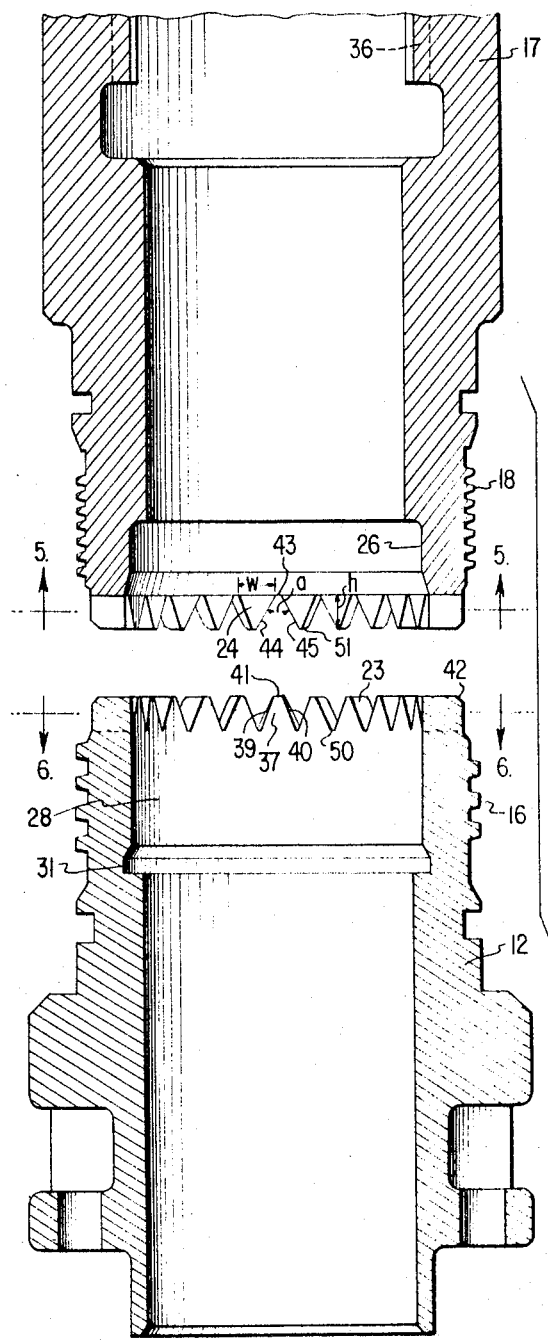
Figure 5:
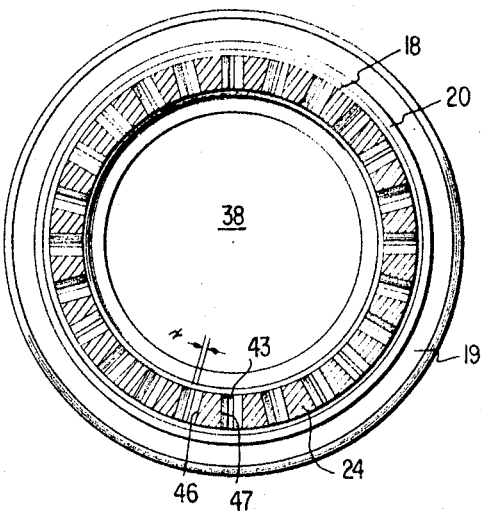
Figure 6:
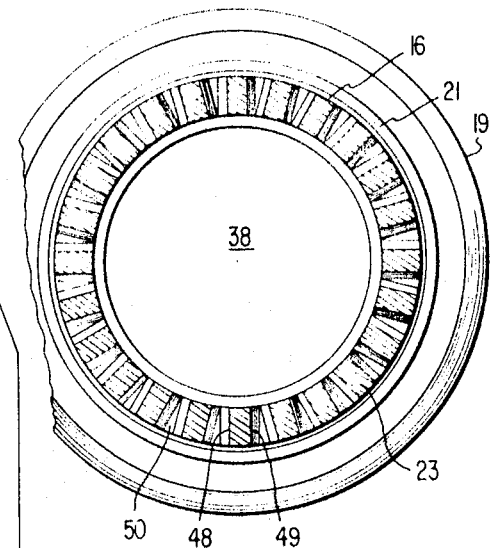

FIGURE 3 provides an enlarged, partially sectioned, view of the packer incorporated in the FIGURE 1 illustration, illustrating the packer components prior to their expansion;

FIGURE 4 provides a still further enlarged view of a unique saw tooth interconnection between a coupling and packer shoe portion of the FIGURE 3 packer, illustrating these components in an axially separated condition;

FIGURE 5 provides a transverse sectional view of a saw tooth coupling portion of th eupper component of the FIGURE 4 assembly as viewed along the section line 5—5; and FIGURE 6 provides a transverse sectional view of the saw tooth coupling portion of the packer shoe of the FIGURE 4 assembly as viewed along the section lines 6—6.

OVERALL STRUCTURE

FIGURE 1 illustrates a well tool which has been lowered into a well bore 2.

Tool assembly 1 includes a conventional, radially expansible, elastomeric packer 3. As shown in FIGURE 1, packer 3 has been expanded radially into engagement with the wall 4 of the well bore 2. Well tool 1 is illustrated as a conventional, formation testing tool string including the packer 3 which serves to isolate a well annulus zone 5 in the vicinity of a perforate, fluid-receiving, conduit section 6.

As will be understood by those skilled in the testing art, well fluid, flowing from a formation 7 into the annulus 5, is transmitted into the interior of the string 1 by way of the perforations in the conduit sections 6. This fluid then flows to conventional pressure-measuring and fluid-entrapping components of the assembly, not illustrated.

During such a testing operation, events may occur which will cause the tool 1 to become stuck in the well bore. Such events may include a partial caving in of the well bore, or a structural failure of one or more tool components.

Regardless of the cause, the existence of a stuck tool may require the milling away of the circumferential periphery of the expanded packer 3. Such milling away is accomplished by a conventional milling tool 8.

Figure 2:
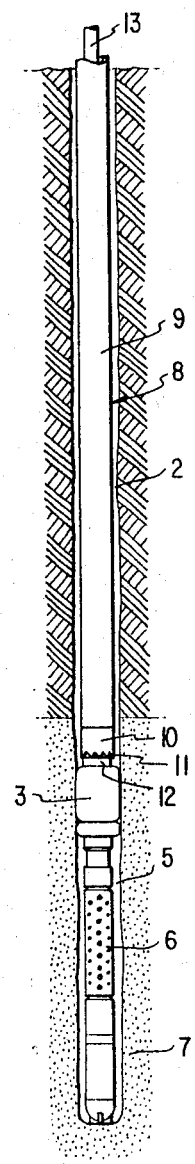
FIGURE 2 illustrates a conventional milling tool telescoped over a conduit portion of the FIGURE 1 assembly, and commencing to drill away a circumferentially peripheral portion of the expanded packer.

As shown in FIGURE 2, milling tool 8 comprises a conduit string 9 supporting an annular milling tool 10 at its lower end. Milling tool 10 includes a conventional, annular milling face 11, facing downwardly toward the packer 3. The milling tool 8 is lowered over the conduit string 1 so as to bring the milling surface or face 11 into milling contact with a packer shoe 12 at the upper end of the expanded packer 3. Rotation of the tool 8, coupled with the imposition of downward force on the milling tool, will cause the milling face 11 to cut away annular, outer portions of the packer shoe 12 and packer 3 so as to facilitate the freeing of the tool.

In this connection, it will be recognized that prior to the commencement of the milling operation, a substantial portion of the conduit string 13 extending upwardly from the packer 3 to the well head may have been removed.

FIGURE 3 illustrates, in substantial detail, the basic components of the packer 3.

Packer 3 includes a generally annular, elastomeric packer element 14. Packer element 14 is supported between the generally tubular, upper packer shoe 12 and a lower packer shoe 15. Packer shoe 12 includes an upwardly facing, generally tubular, externally threaded mill, first male coupling portion 16.

A generally tubular, tool body portion 17 includes a generally tubular, downwardly facing, externally threaded, second, male coupling portion 18.

Coupling portions 16 and 18 are interconnected by an internally threadedly, generally tubular, third, female portion or sleeve coupling 19.

As shown in FIGURE 4, coupling portion 16 is characterized by a coarse threaded configuration, as opposed to the fine threaded configuration of coupling portion 18. In other words, coupling portion 16 has less threads per axial inch than coupling portion 18, although both are cut in the same direction, i.e., both are either right- or left-handed threads.

The upper interior portion 20 of coupling sleeve 19 is threaded to conform to coupling portion 18 while the lower interior threaded portion 21 of sleeve 19 is cut to conform to coupling portion 16.

This form of threaded interconnection yields a differential movement pattern discussed, for example, in the United States Rice Patent 173,239.

Assume, for example, that the coupling 19 is first screwed onto the coupling portion 18. Thereafter, the coupling portion 16 is screwed into the lower coupling portion 21 of the sleeve 19. By then holding the packer shoe 15 stationary, and the body unit 17 stationary, and rotating the sleeve 19 so as to advance it toward the packer shoe 15, the packer shoe 12 and the body portion 17 will be drawn axially together without undergoing relative rotation.

This form of conventional threaded coupling enables the coupling means 16 and 18 to be provided with a torque-resistant interconnection 22.

TORQUE RESISTANT COUPLING

This torque-resistant interconnection 22 is provided by an annular row of symmetric, circumferentially spaced, saw teeth 23 carried by the coupling portion 16 and another annular row of circumferentially spaced, symmetric saw teeth 24 carried by the coupling portion 18. Saw teeth 23 intermesh contiguously with saw teeth 24, as shown in FIGURE 3, so as to prevent or impede relative rotational movement between the components 12 and 17 in either rotary direction.

This intermeshing of saw teeth 23 and 24 is possible because of the differential movement effect, previously discussed, which enables rotation of the sleeve 19 to draw the units 12 and 17 axially together without causing them to undergo relative rotation. Thus, the sleeve 19 may serve to draw the teeth 23 into meshing engagement with the teeth 24.

With the saw teeth 23 intermeshed with the saw teeth 24, the opposite sides of each intermeshed saw teeth are disposed in generally contiguous intermeshing relationship with circumferentially adjacent teeth in the connection 22.

The packer apparatus 3 additionally includes an O-ring type seal 25 secured in a recess portion 26 of tool body portion 17. A generally cylindrical, retaining sleeve 27 engages ring 25 so as to secure it in the upper end of recess 26. Sleeve 27 extends downwardly into a recess 28 of packer shoe 12. The lower end of sleeve 27 includes a radially outwardly facing lip 29.

A plurality of circumferentially spaced, longitudinally extending slots 30 extend upwardly through the sleeve 27 from its lower end, as shown in FIGURE 3. Thus, by virtue of this slotting, the sleeve 27 is provided with a circumferentially contractible lower end. This circumferential contractability enables the rim 29 to be snapped into locking engagement with a locking groove 31 at the lower end of the recess 28. In other words, the slotting 30 enables the lower end of the sleeve 27 to enter the upper end of the recess 28 and move downwardly through this recess until the slotted rim 29 expands radially outwardly into locking engagement with the groove 31.

This combination of sleeve 27 and seal 25 serves to effectively isolate the saw teeth 23 and 24 from a central mandrel 32.

PACKER SETTING MECHANISM

As illustrated in FIGURE 3, mandrel 32 is rigidly connected with a tool coupling portion 33 which extends downwardly and is connected with the perforate pipe portion 6 of the apparatus. Packer 14, shoe 12 and body portion 17 are axially slidable on the mandrel 32. The lower packer shoe 15 prevents the lower extremity of the packer 14 from moving downwardly. Thus, downward axial movement of the body portion 17 causes the shoe 12 to compress and move the upper end of the packer 14 downwardly. This downward movement of the packer upper end causes the packer to expand radially outwardly to set against or engage the well wall 4 as shown in FIGURE 1. During such downward movement, the lower end of the string rests on the well bore base so as to fixedly position packer shoe 15.

Downward force is applied to the tool portion 17 by means of a conventional threaded coupling 17a connected with the tool portion 17 and string portion 13.

A conventional spline joint 34 interconnects the mandrel 32 and the packer body portion 17 so as to enable sliding movement between these components to take place while preventing their relative rotary movement. This spline joint may comprise one or more lugs 35 projecting radially outwardly from the mandrel 4 into a longitudinally extending groove 36 formed in the tool body portion 17.

At this point, it should be noted that the threaded coupling, comprising male threaded portions 16 and 18 and female threaded sleeve 19, comprises a mechanism to facilitate the use of interchangeable different sized packer shoes and elastomeric packer elements.

STRUCTURAL DETAILS OF TORQUE-RESISTANT COUPLING

Specific structural details of the torque-resistant coupling 22 are shown in FIGURES 4, 5 and 6.

Saw teeth 23 may be formed by milling units so that each tooth 23 has a tip 37 extending radially of the common central longitudinal axis 38 of the coupling portions 16, 18 and 19. This extremity 37 is formed by first and second, oppositely facing, tooth side surfaces 39 and 40, the planes of which are flat, converge toward coupling 18, and intersect in a line extending radially of the axis 38.

As shown, the tooth tips may be truncated to provide a flat rectangular extremity 41. Further, the circumferential peripheries of the teeth 23 may be beveled, as shown at 42, so as to facilitate the insertion of the coupling portion 16 into the interior of the sleeve 19.

Teeth 24 of second coupling portion 18 may be fabricated for perfect meshing engagement with teeth 23. Where such meshing engagement occurs, the sides of each tooth 24 will be in flush, contiguous engagement, with circumferentially adjacent sides of teeth 23 in the interior meshed connection 22.

This perfect intermeshing may be achieved by forming the teeth 24 so that their root portions 43 extend radially of the axis 38. Where such radial roots are formed, the mutually facing side surfaces 44 and 45 of circumferentially adjacent teeth 24, both of which are flat and planar, when projected, will intersect to form an intersection extending radially of the axis 38. As shown, adjacent surfaces 44 and 45 converge away from coupling 16.

The roots 43 may be truncated to conform substantially to the longitudinal configuration of the tips 41 of the teeth 23.

As will thus be apparent, by appropriately gauging the spacing between the teeth 23 and 24, the slopes of the sides of these teeth, and the degree of root and tip truncation, perfect teeth intermeshing may be obtained.

Where perfect teeth intermeshing occurs, the section plane shown in FIGURE 5, which extends perpendicular of the common axis 38, of coupling portions 16, 18 and 19, will intersect each tooth 24 in a mid portion so as to yield side lines 46 and 47 converging generally toward the axis 38. In connection with the teeth 23, the plane providing the sections 6—6, which also extends perpendicular to the axis 38, will yield the side line intersections 48 and 49 which lie parallel to a radial median plane of the teeth 23 bearing this intersection line.

As shown in FIGURE 6, the truncated root 50 between each tooth 23 converges toward the axis 38. The configuration of this truncated root 50 will be exactly the same as the configuration of the truncated tip portion 51 of each tooth 24, where perfect intermeshing is desired throughout the teeth side, roots, and tips.

In practice, it has been found, unexpectedly, that both the teeth 23 and 24 may be fabricated so as to have radial roots as illustrated in FIGURE 5 in connection with teeth 24.

It is expected that the teeth 23 and 24 might also be fabricated so as to provide radial tip patterns as described in connection with the teeth 23.

In one commercially satisfactory embodiment of the invention, both the coupling 18 and the coupling 16 were provided with twenty-four teeth 24 and 23, respectively, each fabricated like a tooth 24 having a radial root pattern. The row of teeth 24 were thus circumferentially spaced 15° apart as were the teeth 23. In this embodiment, the inner diameter of each tooth row was about 3.3 inches and the outer diameter 4.1 inches. Each of the teeth 23 and 24 was fabricated so as to have a base width $w$ of approximately .54 inches and a height $h$ of approximately .39 inches. The angle $a$ between the planes 44 and 45 was approximately 60°. The structural configuration of the milling tool was such as to yield a root width $x$ of approximately .06 inch.

In each instance, the couplings 16 and 18 were fabricated from steel of the type ordinarily employed in conduit string coupling sections. This steel, of course, possesses a degree of meaningful elasticity.

As will be appreciated, in this embodiment, mutually adjacent side faces of the intermeshed teeth 23 and 24 would be skewed or inclined to each other.

IMPROVED RESULTS, ADVANTAGES AND SCOPE OF INVENTION

Quite surprisingly, the intermeshed saw teeth 23 and 24 significantly improve the torque resistant strength of the interconnected elements 12, 17 and 19.

The prior art has dictated the necessity of using longitudinally extending, intermeshed lugs and slots as shown, for example, in United States Wilson Patent 1,781,091. Specifically, Wilson urges that the torque-transmitting faces of the lugs and slots must be substantially parallel with the pipe axis.

All this notwithstanding, and in direct contravention of the prior art practice and teachings, it has been discovered that the previously described saw tooth structure provides a multifold increase in sheer resistance or torque strength. Tests performed with a lug and slot connection of the type illustrated in the Wilson patent produced sheer failure at 14,000 foot-pounds. Where the saw teeth structure of the present invention was employed, torque resistance up to 45,000 foot-pounds was encountered.

Significantly, and most surprisingly, this three-fold increase in torque resistance or sheer strength was encountered where both the teeth units 23 and 24 were fabricated with radially extending roots as shown in FIGURE 5.

Obviously, where the teeth 23 and 24 each have radially extending roots, the tooth surfaces 44 will be in skewed but contiguous relation to the tooth surfaces 39. Similarly, the tooth surfaces 45 will be in skewed but contiguous, or near contiguous, relation with the tooth surfaces 40. It is believed that this skewed relationship between tooth surfaces may provide a degree of torsional and elastic yieldability in connection 22 which improves torque resistance. Where conventional elastic steels are employed in the components 12, 17 and 19, the skewed planar engagement between the sides of the teeth 23 and 24 probably provides an elasticity in the connection 22 which contributes to improved torque strength.

It is further noteworthy that where the radial root structure is employed on the teeth 23 and 24, such that perfect or side surface conforming meshing is not possible, the fabrication of the teeth 23 and 24 is simplified. In other words, with radial roots on both teeth configurations, the same milling cutter may be employed to cut each tooth. As will be recognized, this milling cutter may comprise a solid rotary milling unit rotating about an axis perpendicular to a radius extending from the central axis 38. This milling tool would have a diamond-shaped cross section so as to form the V-shaped valleys between adjacent teeth. By merely indexing the unit 12 or 17, the milling tool may be moved radially in and out across the wall of the work piece to form each tooth series.

Significantly, the saw tooth, torque-resistant coupling may be incorporated in the packer 3 without in any way impairing overall packer structure or creating significant structural complexity.

It should further be noted that the seal-retaining sleeve 27 effectively isolates the coupling 22 from the slidable mandrel 32. Thus, the sleeve 27 and coupling sleeve 19 cooperate to effectively isolate and house the intermeshed saw tooth coupling unit 22 from potentially damaging, external, environmental elements.

As will be appreciated, the overall advantage will be optimized by incorporating the saw tooth, torque resistant connection 22 between packer shoe 16 and the packer body member disposed beneath this shoe. This structure, of course, would be substantially identical as that involving elements 16, 18, 19 and 22.

In describing the invention, reference has been made to preferred embodiments. However, those skilled in the art and familiar with the disclosure of this invention may well envision additions, deletions, substitutions or other modifications which would fall within the purview of the invention, as set forth in the appended claims.

I claim:
1. A well tool comprising:
first, generally tubular, coupling means;
second, generally tubular, coupling means;
third, generally tubular, coupling means couplingly engaging each of said first and second coupling means, with said first and second coupling means being in substantially contiguous and mutually facing engagement, and said first, second, and third coupling means having a common longitudinally extending, central axis;
a first series of circumferentially spaced, torque transmitting, first surface means carried by said first coupling means, with each said first surface means extending generally and at least in part transversely of a plane which extends radially of said common longitudinal axis;
a second series of circumferentially spaced, torque transmitting, second surface means carried by said first coupling means, with each said second surface means extending generally and at least in part transversely of a plane which extends radially of said common axis and extending transversely of a circumferentially adjacent first surface means;
a third series of circumferentially spaced, torque transmitting, third surface means carried by said second coupling means, each said third surface means extending generally and at least in part transversely of a plane which extends radially of said common longitudinal axis; and
a fourth series of circumferentially spaced, torque transmitting, fourth surface means carried by said second coupling means, with each said fourth surface means extending generally and at least in part transversely of a plane which extends radially of said common longitudinal axis and extending transversely of a circumferentially adjacent, third surface means.

2. A well tool comprising:
first, generally tubular, male, threaded coupling means;
second, generally tubular, male, threaded coupling means;
third, generally tubular, female, threaded coupling means threadedly engaging each of said first and second coupling means, with said first and second coupling means being in substantially contiguous and mutually facing engagement, and said first, second, and third coupling means having a common, longitudinally extending, central axis;
a first series of circumferentially spaced, torque transmitting, first surface means carried by said first coupling means, with each said first surface means extending transversely of a plane which extends radially of said common longitudinal axis;
a second series of circumferentially spaced, torque transmitting, second surface means carried by said first coupling means, with each said second surface means extending transversely of a plane which extends radially of said common axis and extending transversely of a circumferentially adjacent first surface means;
a third series of circumferentially spaced, torque transmitting, third surface means carried by said second coupling means, with each said third surface means extending transversely of a plane which extends radially of said common longitudinal axis; and
a fourth series of circumferentially spaced, torque transmitting, fourth surface means carried by said second coupling means, with each said fourth surface means extending transversely of a plane which extends radially of said common longitudinal axis and extending transversely of a circumferentially adjacent, third surface means.

3. An apparatus as described in claim 2;
wherein each of said first and second surface means is substantially flat and planar in configuration, with said first and second surface means symmetrically intersecting a plane extending radially of said common axis; and
wherein each of said third and fourth surface means is substantially flat and planar in configuration, with said third and fourth surface means symmetrically intersecting a plane extending radially of said common axis.

4. An apparatus as described in claim 2:
wherein each of said circumferentially adjacent, first and second surface means, converge toward said second coupling means with the planes thereof intersecting to form an intersection extending substantially radially of said common axis; and
wherein each of said circumferentially adjacent, third and fourth surface means converge away from the first coupling means with the planes thereof intersecting to form an intersection extending substantially radially of said common axis.

5. Apparatus as described in claim 2:
wherein each first surface means of said first coupling means is disposed in skewed, and substantially contiguous relation with a third surface means of said second coupling means; and
wherein each of said second surface means is disposed in skewed and substantially contiguous relation with a fourth surface means of said second coupling means.

6. An apparatus as described in claim 2 further including:
cylindrical wall means releasably interconnected with one of said first and second coupling means, disposed radially inwardly of said first and second coupling means and extending contiguous therewith;
mandrel means telescopingly mounted within said cylindrical wall means; and
spline joint means interconnecting the other of said first and second coupling means with said mandrel means.

7. A well assembly comprising:
a well bore;
first, generally tubular, male, threaded coupling means;
second, generally tubular, male, threaded coupling means;
third, generally tubular, female, threaded coupling means threadedly engaging each of said first and second coupling means, with said first and second coupling means being in substantially contiguous and mutually facing engagement, and said first, second and third coupling means having a common longitudinally extending, central axis;
a first series of circumferentially spaced, torque transmitting, first surface means carried by said first coupling means, with each said first surface means extending transversely of a plane which extends radially of said common longitudinal axis;
a second series of circumferentially spaced, torque transmitting, second surface means carried by said first coupling means, with each said second surface means extending transversely of a plane which extends radially of said common axis and extending transversely of a circumferentially adjacent first surface means;
a third series of circumferentially spaced, torque transmitting, third surface means carried by said second coupling means, each said third surface means extending transversely of a plane which extends radially of said common longitudinal axis;

a fourth series of circumferentially spaced, torque transmitting, fourth surface means carried by said second coupling means, each said fourth surface means extending transversely of a plane which extends radially of said common longitudinal axis and extending transversely of a circumferentially adjacent third surface means;

said second coupling means being superposed above said first coupling means in said well bore;

a conduit portion projecting upwardly from said second coupling means;

an expanded packer engaged with said well bore and located beneath said first coupling means and connected therewith;

a packer shoe engaged with said packer, located beneath, and connected with said first coupling means;

mandrel means telescopingly mounted within said first and second coupling means;

spline joint means interconnecting said mandrel means and said second coupling means; and a milling tool telescoped over said conduit portion and said first and second coupling means and drillingly engaged with said packer shoe.

8. A well assembly as described in claim 7:

wherein each of said circumferentially adjacent, first and second surface means converges away from said second coupling means, with the planes thereof intersecting to form an intersection extending substantially radially of said common axis;

wherein each of said circumferentially adjacent, third and fourth surface means converge away from the first coupling means, with the planes thereof intersecting to form an intersection extending substantially radially of said common axis;

wherein each first surface means of said first coupling means is disposed in skewed but substantially contiguous relation with a third surface means of said second coupling means; and wherein each of said second surface means is disposed in skewed and substantially contiguous relation with a fourth surface means of said second coupling means.

References Cited

UNITED STATES PATENTS

| | | | |
|---|---|---|---|
| 173,239 | 2/1876 | Rice | 285—330 |
| 1,499,050 | 6/1924 | Broome | 285—330 |
| 1,589,781 | 6/1926 | Anderson | 285—330 |
| 1,781,091 | 11/1930 | Wilson | 285—175 |
| 3,334,661 | 8/1967 | Milette | 285—330 X |

JAMES A. LEPPINK, Primary Examiner

U.S. Cl. X.R.

285—175, 330